(12) United States Patent  
Yamauchi et al.

(10) Patent No.: US 11,958,724 B2
(45) Date of Patent: Apr. 16, 2024

(54) WORK VEHICLE

(71) Applicant: TADANO LTD., Kagawa (JP)

(72) Inventors: Hiroshi Yamauchi, Kagawa (JP); Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 884 days.

(21) Appl. No.: 16/981,024

(22) PCT Filed: Mar. 27, 2019

(86) PCT No.: PCT/JP2019/013110
§ 371 (c)(1),
(2) Date: Sep. 15, 2020

(87) PCT Pub. No.: WO2019/189320
PCT Pub. Date: Oct. 3, 2019

(65) Prior Publication Data
US 2021/0017003 A1 Jan. 21, 2021

(30) Foreign Application Priority Data

Mar. 28, 2018 (JP) ................................ 2018-062927
Mar. 28, 2018 (JP) ................................ 2018-062928

(51) Int. Cl.
B66C 13/40 (2006.01)
H04Q 9/00 (2006.01)
B66C 23/42 (2006.01)

(52) U.S. Cl.
CPC .............. B66C 13/40 (2013.01); H04Q 9/00 (2013.01); B66C 23/42 (2013.01); H04Q 2209/40 (2013.01)

(58) Field of Classification Search
CPC ......... B66C 13/40; B66C 23/42; B66C 13/46; H04Q 9/00; H04Q 2209/40; B66F 9/07581; G08C 17/02
See application file for complete search history.

(56) References Cited

U.S. PATENT DOCUMENTS

2008/0208395 A1    8/2008  Self et al.
2011/0187513 A1*   8/2011  Taki ..................... G07C 5/008
                                                340/13.25
(Continued)

FOREIGN PATENT DOCUMENTS

DE          4330099 A1    3/1995
JP         H11-165981 A   6/1999
(Continued)

OTHER PUBLICATIONS

Machine Translation of JP2006254161A (Year: 2006).*
(Continued)

*Primary Examiner* — Faris S Almatrahi
*Assistant Examiner* — Sahar Motazedi
(74) *Attorney, Agent, or Firm* — Paratus Law Group, PLLC

(57) ABSTRACT

The invention addresses the problem of providing a work vehicle that can prevent mistakes and confusion in primary settings even when a plurality of operators each operate a remote operation terminal. This work vehicle (crane 1) comprises a work device 40 that is operable using a remote operation terminal 13, wherein a primary setting of the work device 40 can be changed with the remote operation terminal 13 and when one of the plurality of remote operation terminals 13 changes a primary setting, the change is reflected in the other remote operation terminals 13.

4 Claims, 15 Drawing Sheets

(56) References Cited

U.S. PATENT DOCUMENTS

2018/0354760 A1 12/2018 Elliott et al.
2019/0204822 A1 7/2019 Hika et al.
2020/0399863 A1* 12/2020 Aizawa .................. G06Q 50/08

FOREIGN PATENT DOCUMENTS

| JP | 2006254161 A * | 9/2006 |
| JP | 2014-222795 A | 11/2014 |
| JP | 2015-119303 A | 6/2015 |
| JP | 2016-043704 A | 4/2016 |
| JP | 2017-065911 A | 4/2017 |
| JP | 2018-000156 A | 1/2018 |
| WO | WO 2007/002675 A2 | 1/2007 |
| WO | WO 2017/070564 A2 | 4/2017 |
| WO | WO 2018/047671 A1 | 3/2018 |

OTHER PUBLICATIONS

Dec. 2, 2021, European Search Report issued for related EP Application No. 19777802.0.
Jun. 4, 2019, International Search Report issued for related PCT Application No. PCT/JP2019/013110.
Jun. 4, 2019, International Search Opinion issued for related PCT Application No. PCT/JP2019/013110.

* cited by examiner

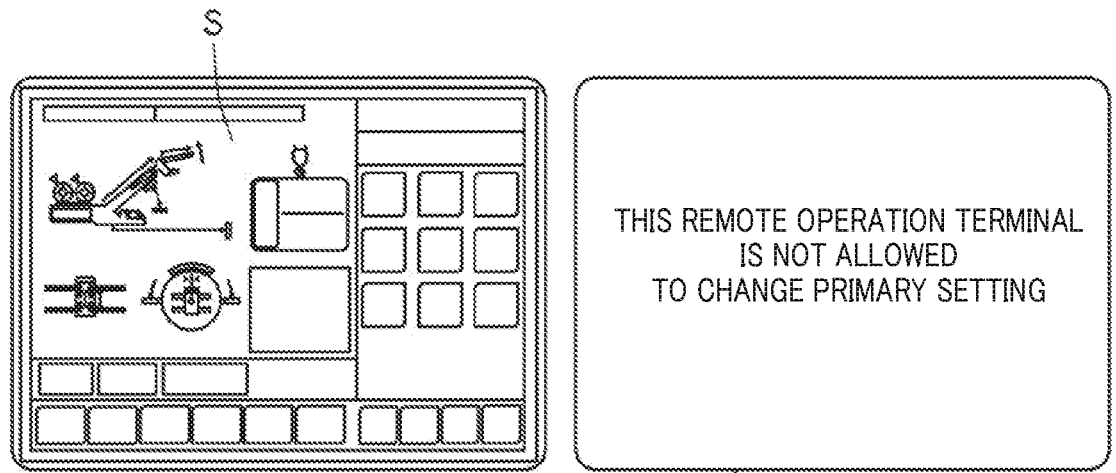
FIG. 13A  FIG. 13B
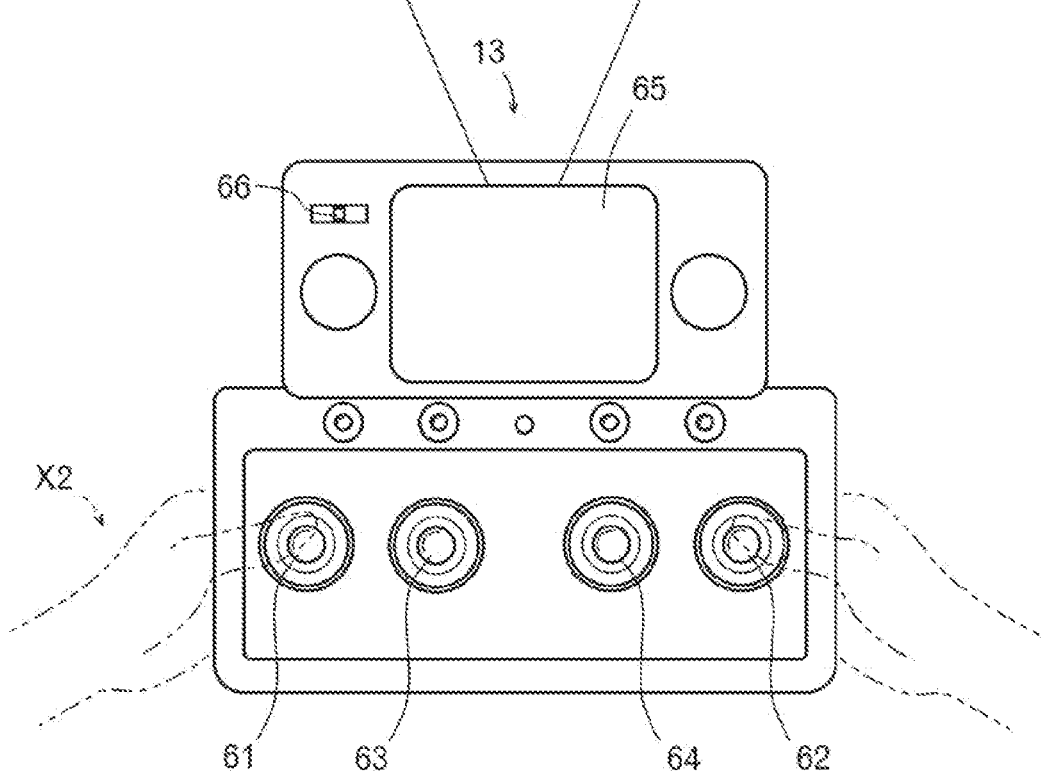

WORK VEHICLE

CROSS REFERENCE TO PRIOR APPLICATION

This application is a National Stage Patent Application of PCT International Patent Application No. PCT/JP2019/013110 (filed on Mar. 27, 2019) under 35 U.S.C. § 371, which claims priority to Japanese Patent Application Nos. 2018-062927 (filed on Mar. 28, 2018) and 2018-062928 (filed on Mar. 28, 2018), which are all hereby incorporated by reference in their entirety.

TECHNICAL FIELD

The present invention relates to work vehicles. Specifically, the present invention relates to a work vehicle that can prevent mistakes and confusion in a primary setting even when a plurality of operators each operate respective remote operation terminals.

BACKGROUND ART

Conventionally, cranes are known to be typical working vehicles. The crane is mainly composed of a traveling body and a swivel body. The traveling body is provided with a plurality of wheels and is configured to travel freely. The swiveling body includes a work apparatus constituted by a boom, a hook, and the like and is configured to carry a load freely.

There is a crane in which a work apparatus is operable by a remote operation terminal (see Patent Literature (hereinafter, referred to as "PTL") 1). In addition, there is proposed a crane in which a primary setting of a work apparatus is configured to be changed by using a remote operation terminal. In such cranes, there is a possibility of the primary setting of the work apparatus being changed incorrectly when a plurality of operators each operate respective remote operation terminals. In other words, there is a possibility of occurrence of mistakes and confusion in the primary setting. It is considered that the same applies to the other work vehicles that include a plurality of remote operation terminals. Thus, a work vehicle that can prevent mistakes and confusion in a primary setting, even when a plurality of operators each operate respective remote operation terminals, has been desired.

CITATION LIST

Patent Literature

PTL 1
Japanese Patent Application Laid-Open No. 2017-65911

SUMMARY OF INVENTION

Technical Problem

A work vehicle is provided that can prevent mistakes and confusion in a primary setting, even when a plurality of operators each operate respective remote operation terminals.

Solution to Problem

A work vehicle of the present invention includes:
a work apparatus,
the work apparatus being freely operable by a remote operation terminal, in which:
a primary setting of the work apparatus is allowed to be changed by using the remote operation terminal; and
when the primary setting is changed by one of a plurality of the remote operation terminals, the change of the primary setting is also reflected in another or other of the remote operation terminals.

In the work vehicle according to the present invention, only previously specified one of the remote operation terminals is allowed to change the primary setting, and when the primary setting is changed by the one of the remote operation terminals, the change is also reflected in another or other of the remote operation terminals.

In the work vehicle according to the present invention:
each of the remote operation terminals includes a switching tool; and
only one of the remote operation terminals which is selected by the switching tool is allowed to change the primary setting, and when the primary setting is changed by the one of the remote operation terminals, the change of the primary setting is also reflected in another or other of the remote operation terminals.

In the work vehicle according to the present invention:
each of the remote operation terminals includes an image display; and
a screen in which a content to be reflected is written is displayed on the image display of each of the other of the remote operation terminals.

In the work vehicle according to the present invention:
each of the remote operation terminals includes an image display; and
when one of the remote operation terminals is operated, a screen asking whether to reflect a content of a previous change in the primary setting is displayed on the image display of the one of the remote operation terminals.

In the work vehicle according to the present invention:
when it is selected to reflect the content of the previous change in the primary setting,
a screen in which the content to be reflected is written is displayed on the image display of each of the other of the remote operation terminals.

In the work vehicle according to the present invention:
while one of the remote operation terminals is operated, all of the remote operation terminals are prohibited from changing a primary setting.

A work vehicle according to the present invention includes:
a work apparatus,
the work apparatus being freely operable by a remote operation terminal, wherein:
a primary setting of the work apparatus is allowed to be changed by using the remote operation terminal; and
only one of a plurality of the remote operation terminals is allowed to change the primary setting.

In the work vehicle according to the present invention:
only previously specified one of the remote operation terminals is allowed to change the primary setting.

In the work vehicle according to the present invention:
each of the remote operation terminals includes a switching tool; and
only one of the remote operation terminals which is selected by the switching tool is allowed to change the primary setting.

In the work vehicle according to the present invention:
each of the remote operation terminals includes a light section; and the light section is turned on in only the remote operation terminal that is allowed to change the primary setting.

In the work vehicle according to the present invention: each of the remote operation terminals includes an image display; and information indicating that changing of the primary setting is allowed is displayed on only the remote operation terminal that is allowed to change the primary setting.

In the work vehicle according to the present invention: each of the remote operation terminals includes an image display;

in the remote operation terminal that is allowed to change the primary setting, a primary-setting change screen is displayed on the image display; and in each of the remote operation terminals that are not allowed to change the primary setting, the primary-setting change screen is not displayed on the image display.

Advantageous Effects of Invention

According to a work vehicle according to the present invention, a primary setting of a work apparatus is configured to be changed by using a remote operation terminal. When a change in the primary setting is performed by, of a plurality of the remote operation terminals, one of the remote operation terminals, the change is also reflected in the other remote operation terminals. According to such a work vehicle, an equal primary setting is reflected in all of the remote operation terminals. Consequently, it is possible to prevent mistakes and confusion in the primary setting, even when a plurality of operators each operate respective remote operation terminals.

According to the work vehicle according to the present invention, only previously specified one of the remote operation terminals is allowed to change the primary setting, and, when a change in the primary setting is performed by the one of the remote operation terminals, the change is also reflected in the other remote operation terminals. According to such a work vehicle, only a person holding a predetermined remote operation terminal can change the primary setting of the work apparatus, and the content of the change is also reflected in the other remote operation terminals. Consequently, it is possible to prevent mistakes and confusion in the primary setting.

According to the work vehicle according to the present invention, each of the remote operation terminals includes a switching tool. Only one of the remote operation terminals selected by the switching tool is allowed to change the primary setting, and, when a change in the primary setting is performed by the one of the remote operation terminals, the change is also reflected in the other remote operation terminals. According to such a work vehicle, only a person holding the selected one of the remote operation terminals can change the primary setting of the work apparatus, and the content of the change is also reflected in the other remote operation terminals. Consequently, it is possible to prevent mistakes and confusion in the primary setting.

According to the work vehicle according to the present invention, each of the remote operation terminals includes an image display. A screen in which a content to be reflected is written is displayed on the image display of each of the other remote operation terminals. According to such a work vehicle, it is possible to prevent the primary setting of the work apparatus from being changed unexpectedly. Consequently, it is possible to prevent mistakes and confusion in the primary setting.

According to the work vehicle according to the present invention, each of the remote operation terminals includes an image display. When one of the remote operation terminals is operated, a screen asking whether to reflect a content of a previous change in the primary setting is displayed on the image display of the one of the remote operation terminals. According to such a work vehicle, it is possible to prevent the primary setting of the work apparatus from being changed unexpectedly. Consequently, it is possible to prevent mistakes and confusion in the primary setting.

According to the work vehicle according to the present invention, when it is selected to reflect the content of the previous change in the primary setting, a screen in which the content to be reflected is written is displayed on the image display of each of the other remote operation terminals. According to such a work vehicle, it is possible to prevent the primary setting of the work apparatus from being changed unexpectedly. Consequently, it is possible to prevent mistakes and confusion in the primary setting.

According to the work vehicle according to the present invention, while one of the remote operation terminals is operated, all of the remote operation terminals are prohibited from changing a primary setting. According to such a work vehicle, it is possible to prevent the primary setting of the work apparatus from being changed unexpectedly. Consequently, it is possible to prevent mistakes and confusion in the primary setting. In addition, it is possible to achieve an improvement in the safety of the operation of the work apparatus.

According to the work vehicle according to the present invention, the primary setting of the work apparatus is configured to be changed by using the remote operation terminal. In addition, of a plurality of the remote operation terminals, only one of the remote operation terminals is allowed to change the primary setting. According to such a work vehicle, only a person holding a predetermined remote operation terminal can change the primary setting of the work apparatus. Consequently, it is possible to prevent mistakes and confusion in the primary setting, even when a plurality of operators each operate respective remote operation terminals.

According to the work vehicle according to the present invention, only previously specified one of the remote operation terminals is allowed to change the primary setting. According to such a work vehicle, only a person holding a predetermined remote operation terminal can change the primary setting of the work apparatus reliably, even with a simple configuration.

According to the work vehicle according to the present invention, each of the remote operation terminals includes a switching tool. Only one of the remote operation terminals selected by the switching tool is allowed to change the primary setting. According to such a work vehicle, one of the remote operation terminals can be freely selected, and only a person holding the one of the remote operation terminals can change the primary setting of the work apparatus.

According to the work vehicle according to the present invention, each of the remote operation terminals includes a light section. The light section is turned on in only the remote operation terminal that is allowed to change the primary setting. According to such a work vehicle, it is possible to recognize at a glance that the remote operation terminal is allowed to change the primary setting.

According to the work vehicle according to the present invention, each of the remote operation terminals includes an image display. Information that changing of the primary setting is allowed is displayed on the image display in only the remote operation terminal that is allowed to change the primary setting. According to such a work vehicle, it is possible to recognize at a glance that the remote operation terminal is allowed to change the primary setting.

According to the work vehicle according to the present invention, each of the remote operation terminals includes an image display. In the remote operation terminal that is allowed to change the primary setting, a primary-setting change screen is displayed on the image display, and, in each of the remote operation terminals that are not allowed to change the primary setting, the primary-setting change screen is not displayed on the image display. According to such a work vehicle, it is possible in the remote operation terminal allowed to change the primary setting to perform an operation of changing the primary setting. In contrast, it is not possible in the remote operation terminals not allowed to change the primary setting to even perform an operation of changing the primary setting. Consequently, it is possible to eliminate an operation of changing a primary setting being performed in vain in the remote operation terminals not allowed to change the primary setting.

BRIEF DESCRIPTION OF DRAWINGS

FIGS. 13A and 13B illustrate display modes for each remote operation terminal.

DESCRIPTION OF EMBODIMENTS

In the present application, a crane, which is a representative work vehicle, will be described. The technical concept disclosed in the present application is also applicable to other cranes, in addition to crane 1 described below.

Figure 1:
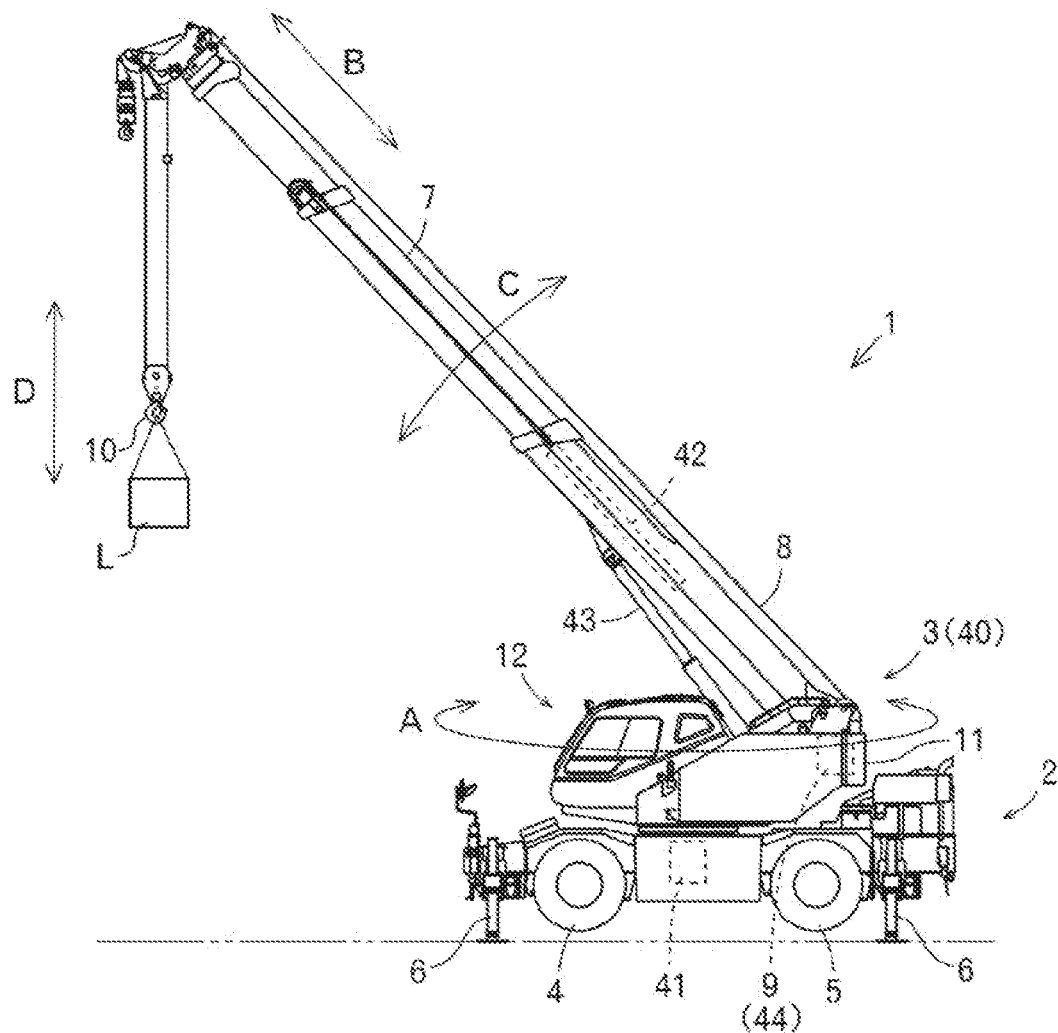
FIG. 1 illustrates a crane.

First, with reference to FIG. 1, crane 1 will be described.
Crane 1 is constituted by, mainly, traveling body 2 and swiveling body 3.
Traveling body 2 includes a left-right pair of front wheels 4 and a left-right pair of rear wheels 5. Traveling body 2 also includes outriggers 6 that are grounded for stabilization when carrying work of load L is performed. Traveling body 2 supports swiveling body 3 on an upper portion thereof and is able to swivel swiveling body 3 by an actuator.

Swiveling body 3 includes boom 7 projecting forward from a rear portion thereof. Thus, boom 7 is able to be swiveled (see arrow A) by an actuator. Boom 7 is also extendable and retractable (see arrow B) by an actuator. Moreover, boom 7 is able to be luffed up (see arrow C) by an actuator. In addition, wire rope 8 is stretched around boom 7. On the base end side of boom 7, winch 9 around which wire rope 8 is wound is disposed, and on the distal end side of boom 7, hook 10 is hung by wire rope 8. Winch 9 is configured to be integral with an actuator and enables winding in and winding out of wire rope 8. Therefore, hook 10 is able to be lifted and lowered (see arrow D) by the actuator. Swiveling body 3 includes counter weight 11 at the rear of boom 7. Swiveling body 3 also includes cabin 12 at the side of boom 7. In an inner portion of cabin 12, there are disposed swivel manipulation tool 21, extension/retraction manipulation tool 22, luffing manipulation tool 23, and winding manipulation tool 24, which will be described later.

Next, with reference to FIG. 2 and FIG. 3, an operation system will be described. The operation system is, however, an example of a conceivable configuration and is not limited thereto. Here, description will be provided with an operator who performs an operation while riding on crane 1 being referred to as "operator X1" and an operator who performs an operation without riding on crane 1 being referred to as "operator X2".

The operation system is constituted by, mainly, control apparatus 20. Various types of manipulation tools 21 to 24 are connected to control apparatus 20. Various types of valves 31 to 34 are also connected to control apparatus 20.

As described above, boom 7 is able to be swiveled (see arrow A in FIG. 1) by an actuator. In the present application, such an actuator is defined as hydraulic swivel motor 41. Hydraulic swivel motor 41 is operated, as appropriate, by swiveling valve 31, which is an electromagnetic proportional switching valve. In other words, hydraulic swivel motor 41 is operated, as appropriate, in response to swiveling valve 31 switching the flow direction of a hydraulic oil or controlling the flow rate of the hydraulic oil. Swiveling valve 31 is operated on the basis of the operation of swivel manipulation tool 21 by operator X1. The swiveling angle and the swiveling speed of boom 7 are detected by a sensor (not illustrated). Thus, control apparatus 20 can recognize the swiveling angle and the swiveling speed of boom 7.

As described above, boom 7 is extendable and retractable (see arrow B in FIG. 1) by an actuator. In the present application, such an actuator is defined as extension/retraction hydraulic cylinder 42. Hydraulic extension/retraction cylinder 42 is operated, as appropriate, by extension/retraction valve 32, which is an electromagnetic proportional switching valve. In other words, extension/retraction hydraulic cylinder 42 operated, as appropriate, in response to extension/retraction valve 32 switching the flow direction of the hydraulic oil or controlling the flow rate of the hydraulic oil. Extension/retraction valve 32 is operated on the basis of the operation of extension/retraction manipulation tool 22 by operator X1. The extension/retraction length and the extension/retraction speed of boom 7 are detected by a sensor (not illustrated). Thus, control apparatus 20 can recognize the extension/retraction length and the extension/retraction speed of boom 7.

Further, as described above, boom 7 is able to be luffed up (see arrow C in FIG. 1) by an actuator. In the present application, such an actuator is defined as hydraulic luffing cylinder 43. Hydraulic luffing cylinder 43 is operated, as appropriate, by luffing valve 33, which is an electromagnetic proportional switching valve. In other words, hydraulic luffing cylinder 43 is operated, as appropriate, in response to luffing valve 33 switching the flow direction of the hydraulic oil or controlling the flow rate of the hydraulic oil. Luffing valve 33 is operated on the basis of the operation of luffing manipulation tool 23 by operator X1. The luffing angle and the luffing speed of boom 7 are detected by a sensor (not illustrated). Thus, control apparatus 20 can recognize the luffing angle and the luffing speed of boom 7.

Further, as described above, hook 10 is able to be lifted and lowered (see arrow D in FIG. 1) by an actuator. In the present application, such an actuator is defined as hydraulic winding motor 44. Hydraulic winding motor 44 is operated, as appropriate, by winding valve 34, which is an electromagnetic proportional switching valve. In other words, hydraulic winding motor 44 is operated, as appropriate, in response to winding valve 34 switching the flow direction of the hydraulic oil or controlling the flow rate of the hydraulic oil. Winding valve 34 is operated on the basis of the operation of winding manipulation tool 24 by operator X1. The hanging length and the lifting-lowering speed of hook 10 are detected by a sensor (not illustrated). Thus, control apparatus 20 can recognize the hanging length and the lifting-lowering speed of hook 10.

In addition, information relay device 35 is connected to control apparatus 20. Information relay device 35 is, however, unnecessary when remote operation terminal 13 is of a wire type.

Information relay device 35 is a device that transmits and receives information converted into a radio signal. At least an antenna of information relay device 35 is mounted on a distal end portion of boom 7 to reduce an influence of planimetric features and the like onto radio waves. Information relay device 35 is connected to, in addition to control apparatus 20, control apparatus 60, which will be described later, of remote operation terminal 13. Therefore, information relay device 35 can transmit information from control apparatus 20 to control apparatus 60. Information relay device 35 also can transmit information from control apparatus 60 to control apparatus 20.

In addition, the operation system includes a plurality of remote operation terminals 13. Each remote operation terminal 13 includes control apparatus 60. Each remote operation terminal 13 also includes a transmitter and a receiver (not illustrated). Remote operation terminal 13 in the present application is an example of a remote operation terminal and is not limited thereto.

Swivel manipulation tool 61 is disposed on remote operation terminal 13. Swivel manipulation tool 61 is connected to control apparatus 60. Control apparatus 60 is connected to above-described control apparatus 20 via a radio signal. Therefore, when operate X2 tilts swivel manipulation tool 61 in a direction (see arrow E in FIG. 3), a swiveling operation of boom 7 is performed similarly to when above-described swivel manipulation tool 21 is tilted in a direction. In other words, when operator X2 tilts swivel manipulation tool 61 in a direction, hydraulic swivel motor 41 is operated, as appropriate, and boom 7 swivels leftward or swivels rightward.

Remote operation terminal 13 also includes extension/retraction manipulation tool 62. Extension/retraction manipulation tool 62 is connected to control apparatus 60. Control apparatus 60 is connected to above-described control apparatus 20 via a radio signal. Therefore, when operate X2 tilts extension/retraction manipulation tool 62 in a direction (see arrow F in FIG. 3), an extension/retraction operation of boom 7 is performed similarly to when above-described extension/retraction manipulation tool 22 is tilted in a direction. In other words, when operator X2 tilts extension/retraction manipulation tool 62 in a direction, extension/retraction hydraulic cylinder 42 is operated, as appropriate, and boom 7 extends or retracts.

Further, remote operation terminal 13 includes luffing manipulation tool 63. Luffing manipulation tool 63 is connected to control apparatus 60. Control apparatus 60 is connected to above-described control apparatus 20 via a radio signal. Therefore, when operator X2 tilts luffing manipulation tool 63 in a direction (see arrow G in FIG. 3), a luffing operation of boom 7 is performed similarly to when above-mentioned luffing manipulation tool 23 is tilted in a direction. In other words, when operator X2 tilts luffing manipulation tool 63 in a direction, hydraulic luffing cylinder 43 is operated, as appropriate, and boom 7 is raised or tilted.

In addition, remote operation terminal 13 includes winding manipulation tool 64. Winding manipulation tool 64 is connected to control apparatus 60. Control apparatus 60 is connected to above-described control apparatus 20 via a radio signal. Therefore, when operator X2 tilts winding manipulation tool 64 in a direction (see arrow H in FIG. 3), a lifting-lowering operation of hook 10 is performed similarly to when above-mentioned winding manipulation tool 24 is tilted in a direction. In other words, when operator X2 tilts winding manipulation tool 64 in a direction, hydraulic winding motor 44 is operated, as appropriate, and hook 10 is lifted or lowered.

In addition, remote operation terminal 13 includes image display 65. Image display 65 is connected to control apparatus 60. Control apparatus 60 is connected to above-described control apparatus 20 via a radio signal. Therefore, control apparatus 20 can provide information to operator X2 through image display 65. Image display 65 is a so-called touch panel and is thus considered an input device for operator X2. Therefore, operator X2 can also provide information to control apparatus 20 through image display 65. Image display 65 is mounted at the front face of remote operation terminal 13 so that operator X2 can visually recognize image display 65 while operating various types of manipulation tools 61 to 64.

According to such an operation system, it is possible for a plurality of operators X2 to each operate respective remote operation terminals 13 and cause work apparatus 40 to operate. This exerts an effect that, even in a work site where many blind areas are present for one operator X2, it is possible to perform an operation of causing work apparatus 40 to operate with the operation being taken over by a plurality of operators X2 sequentially. Note that work apparatus 40 has the same meaning as swiveling body 3 and denotes "crane apparatus" constituted by boom 7, hook 10, and the like.

Next, with reference to FIGS. 4 to 8, a screen on which a primary setting of work apparatus 40 is changed will be described. Here, it is assumed that, of a plurality of remote operation terminals 13, only one of the remote operation terminals 13 is allowed to change the primary setting. Hereinafter, description will be provided by focusing on the one of the remote operation terminals 13.

Remote operation terminal 13 can change various primary settings of work apparatus 40. The primary settings are, for example, a crane setting, an outrigger setting, a counter weight setting, and the like. On initial screen S, image FIG. 1a showing the swiveling angle of boom 7 is drawn. In addition, image FIG. 1b showing the extension/retraction length, the swiveling angle, and the like of boom 7 is drawn. Further, image FIG. 1c showing the projecting length of each outrigger 6 is drawn. In addition, image FIG. 1d in which values of the rated load, the real load, and the like are written is drawn. It is also possible through screen S to determine an operation range limit (defined by a boom upper-limit-angle limit, a boom lower-limit-angle setting, a working radius limit, a left swiveling limit, and a right swiveling limit) of work apparatus 40.

Figure 11:
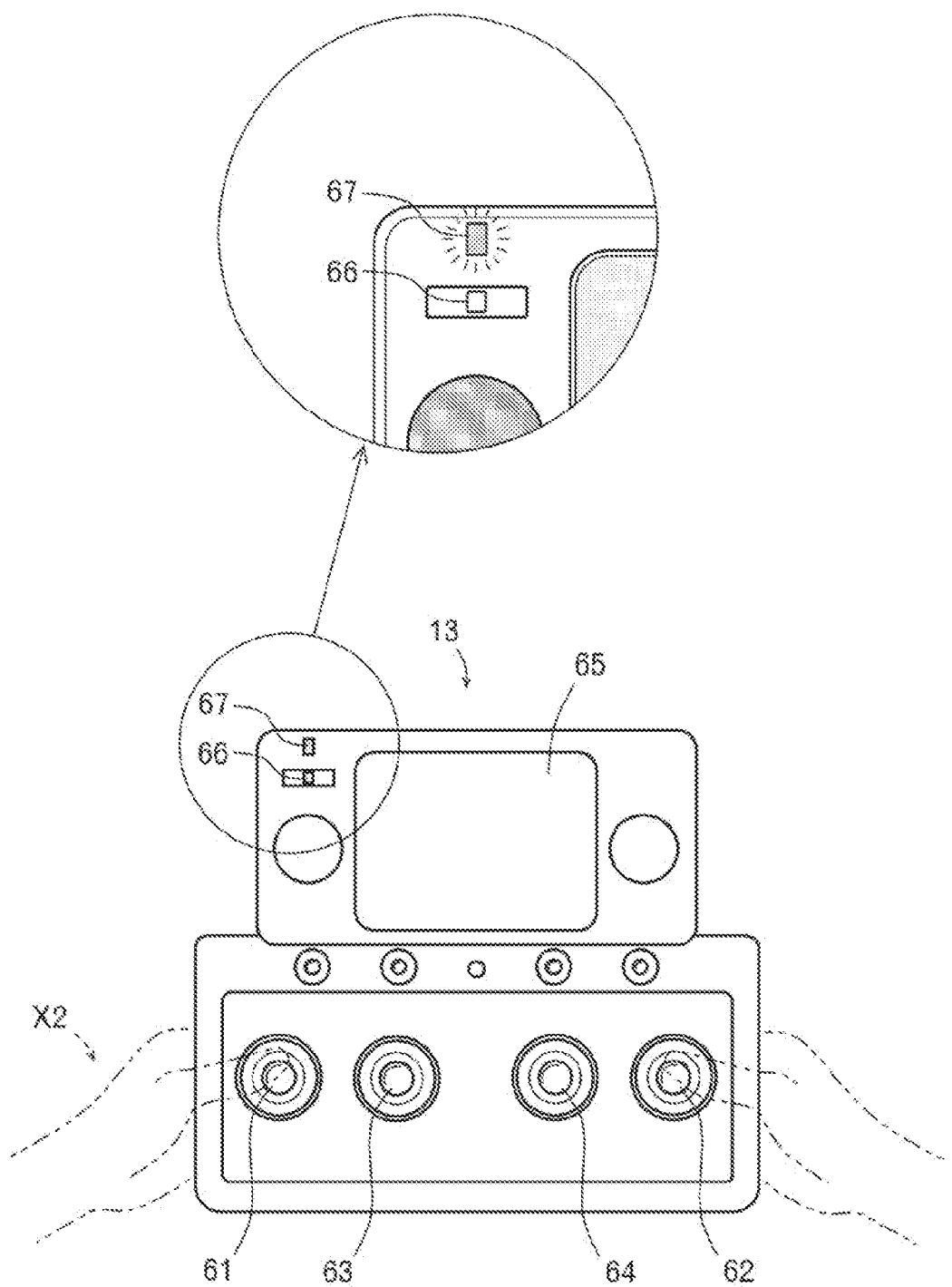
FIG. 11 illustrates a remote operation terminal according to one embodiment.

Next, the crane setting will be briefly described. When operator X2 presses button B1 relating to the crane setting, predetermined screen S1 is displayed (see FIG. 5) on image display 65. Screen S1 includes image FIG. 11 showing a state of boom 7. Image FIG. 11 is a figure in which the distal end portion of boom 7 is drawn in a simple manner, and the state thereof sequentially changes to a boom working state and a jib working state, which are so called, in response to forward button Bf or backward button Bb being pressed. The primary setting is determined by pressing of set-key button Bs by an operator.

Figure 12:
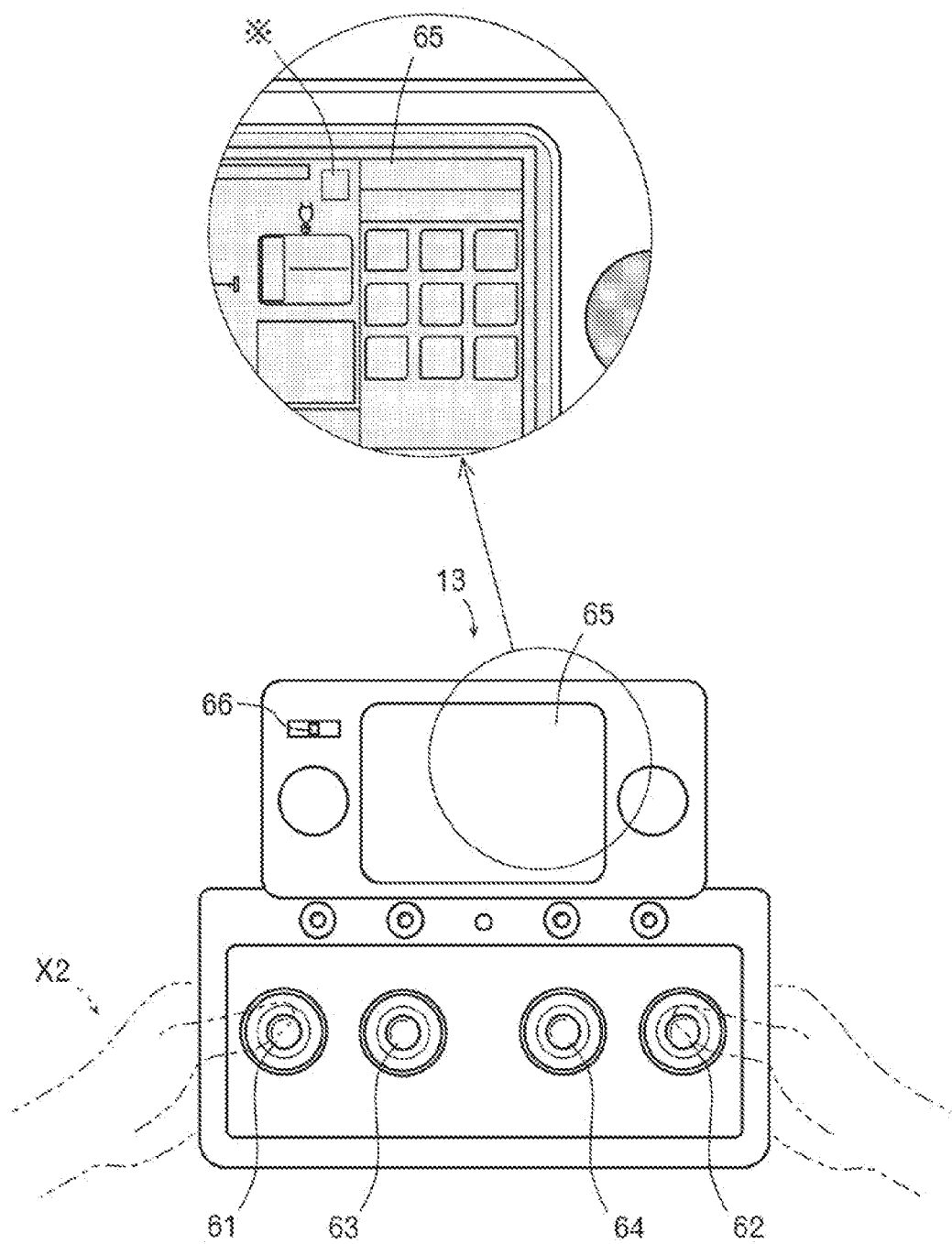
FIG. 12 illustrates a remote operation terminal according to another embodiment.

Next, the outrigger setting will be briefly described. When an operator presses button B2 relating to the outrigger setting, predetermined screen S2 is displayed (see FIG. 6) on image display 65. Screen S2 includes image FIG. 12 showing a state of outriggers 6. Image FIG. 12 is a figure in which the projecting length of each outrigger 6 is drawn in a simple manner, and the projecting length of each outrigger 6 gradually changes in response to forward button Bf or backward button Bb being pressed. The primary setting is determined by pressing of set-key button Bs by an operator.

Next, the counter weight setting will be briefly described. When an operator presses button B3 relating to the counter weight setting, predetermined screen S3 is displayed (see FIG. 7) on image display 65. Screen S3 includes image FIG. 13 showing a state of counter weight 11. Image FIG. 13 is a figure in which the gross weight of counter weight 11 is drawn in a simple manner, and the gross weight of counter weight 11 gradually changes in response to forward button Bf or backward button Bb being pressed. The primary setting is determined by pressing of set-key button Bs by an operator.

Here, a mechanism in which, when a change in a primary setting is performed by, of a plurality of remote operation terminals 13, one of the remote operation terminals 13, the change is also reflected in the other remote operation terminals 13 will be described.

Figure 8A:
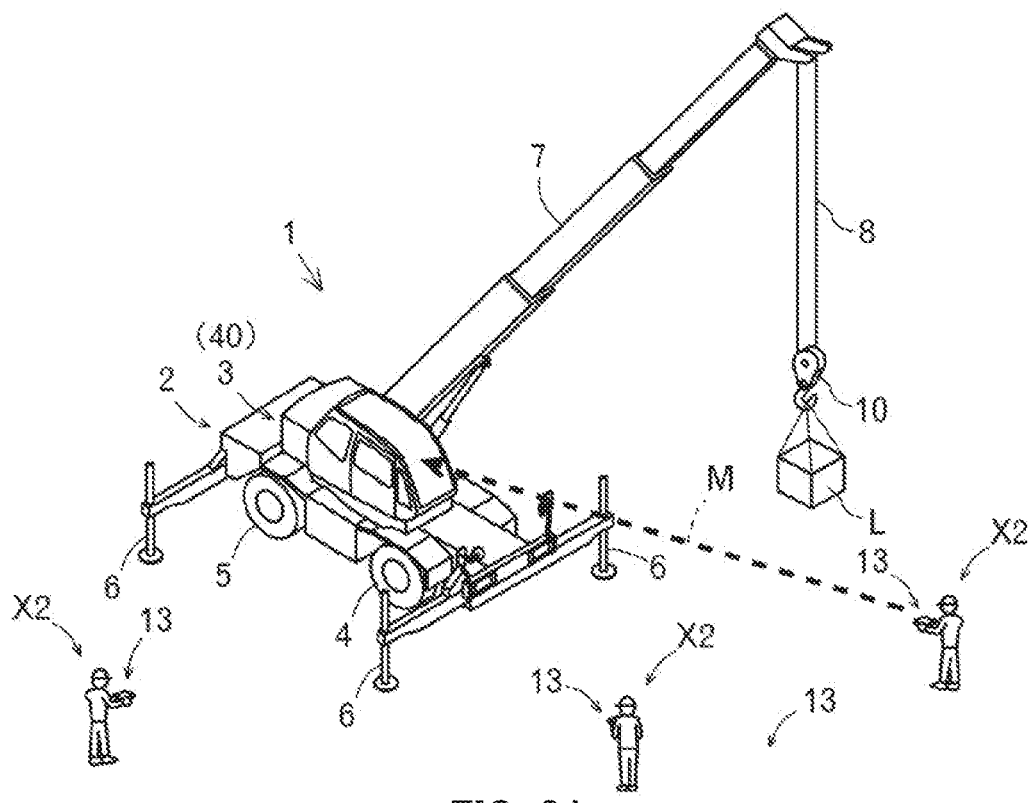
FIGS. 8A and 8B illustrate information transmission routes when a primary setting is changed.
Figure 8B:
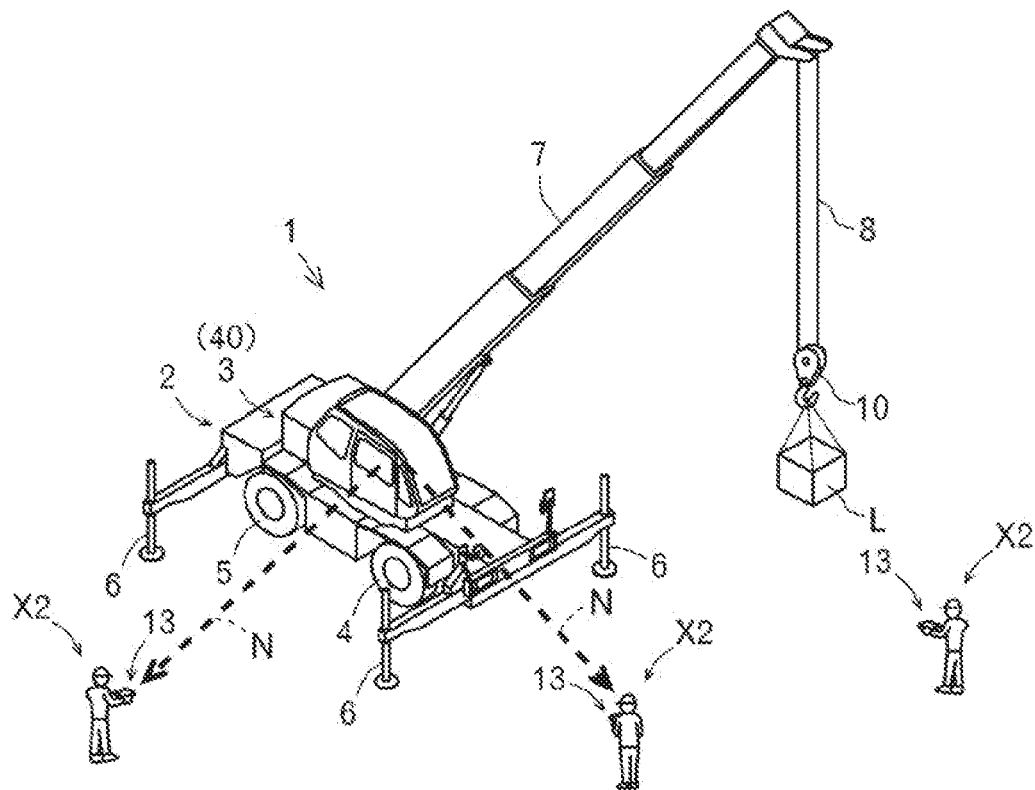

First, when a change in a primary setting is performed by operator X2 holding predetermined remote operation terminal 13, the information is transmitted to control apparatus 20 (see arrow M in FIG. 8A). In other words, when a change in a primary setting is performed by operator X2 holding predetermined remote operation terminal 13, the information is converted into a radio signal and sent from a transmitter (not illustrated). The radio signal is transmitted to control apparatus 20 by being received by information relay device 35 and decoded. Thus, control apparatus 20 recognizes that the primary setting of work apparatus 40 has been changed and controls various types of valves 31 to 34 on the basis of a new primary setting.

Then, when control apparatus 20 recognizes that the primary setting of work apparatus 40 has been changed, the information is transmitted (see arrow N in FIG. 8B) to the other remote operation terminals 13. In other words, when control apparatus 20 recognizes that the primary setting of work apparatus 40 has been changed, the information is converted into a radio signal and sent from information relay device 35. Then, the radio signal is transmitted to control apparatus 60 by being received by a receiver (not illustrated) and decoded. Thus, control apparatus 60 recognizes that the primary setting of work apparatus 40 has been changed, and cancels and replaces an old primary setting with a new primary setting.

As above, crane 1 can change a primary setting of work apparatus 40 by using remote operation terminals 13. When a change in the primary setting is performed by, of a plurality of remote operation terminals 13, one of remote operation terminals 13, the change is also reflected in the other remote operation terminals 13. According to such crane 1, an equal primary setting is reflected in all of remote operation terminals 13. Consequently, it is possible to prevent mistakes and confusion in the primary setting, even when a plurality of operators X2 each operate respective remote operation terminals 13.

As a method of determining, among a plurality of remote operation terminals 13, one of remote operation terminals 13, it is conceivable to previously specify one of remote operation terminals 13. In other words, one of remote operation terminals 13 is primitively specified by eliminating a range of choice.

In this case, in crane 1, only previously specified one of remote operation terminals 13 is allowed to change a primary setting, and when a change in the primary setting is performed by the one of remote operation terminals 13, the change is also reflected in the other remote operation terminals 13. According to such crane 1, only a person (operator X2) holding predetermined remote operation terminal 13 can change a primary setting of work apparatus 40, and the content of the change is also reflected in the other remote operation terminals 13. Consequently, it is possible to prevent mistakes and confusion in the primary setting.

In addition, as a method of determining, among a plurality of remote operation terminals 13, one of the remote operation terminals 13, it is conceivable to enable operator X2 to freely specify one of remote operation terminals 13. In other words, as with remote operation terminal 13 of the present application, switching tool 66 is provided (see FIGS. 2 and 3) so that operator X2 can specify one of remote operation terminals 13 by operating switching tool 66.

In this case, in crane 1, each remote operation terminal 13 includes switching tool 66. Only one remote operation terminal 13 selected by switching tool 66 is allowed to change a primary setting, and when a change in the primary setting is performed by the one of remote operation terminals 13, the change is also reflected in the other remote operation terminals 13. According to such crane 1, only a person (operator X2) holding the selected one of remote operation terminals 13 can change a primary setting of work apparatus 40, and the content of the change is also reflected in the other remote operation terminals 13. Consequently, it is possible to prevent mistakes and confusion in the primary setting.

In this respect, it is preferable for operator X2 to be able to confirm what contents are to be reflected.

Figure 2:
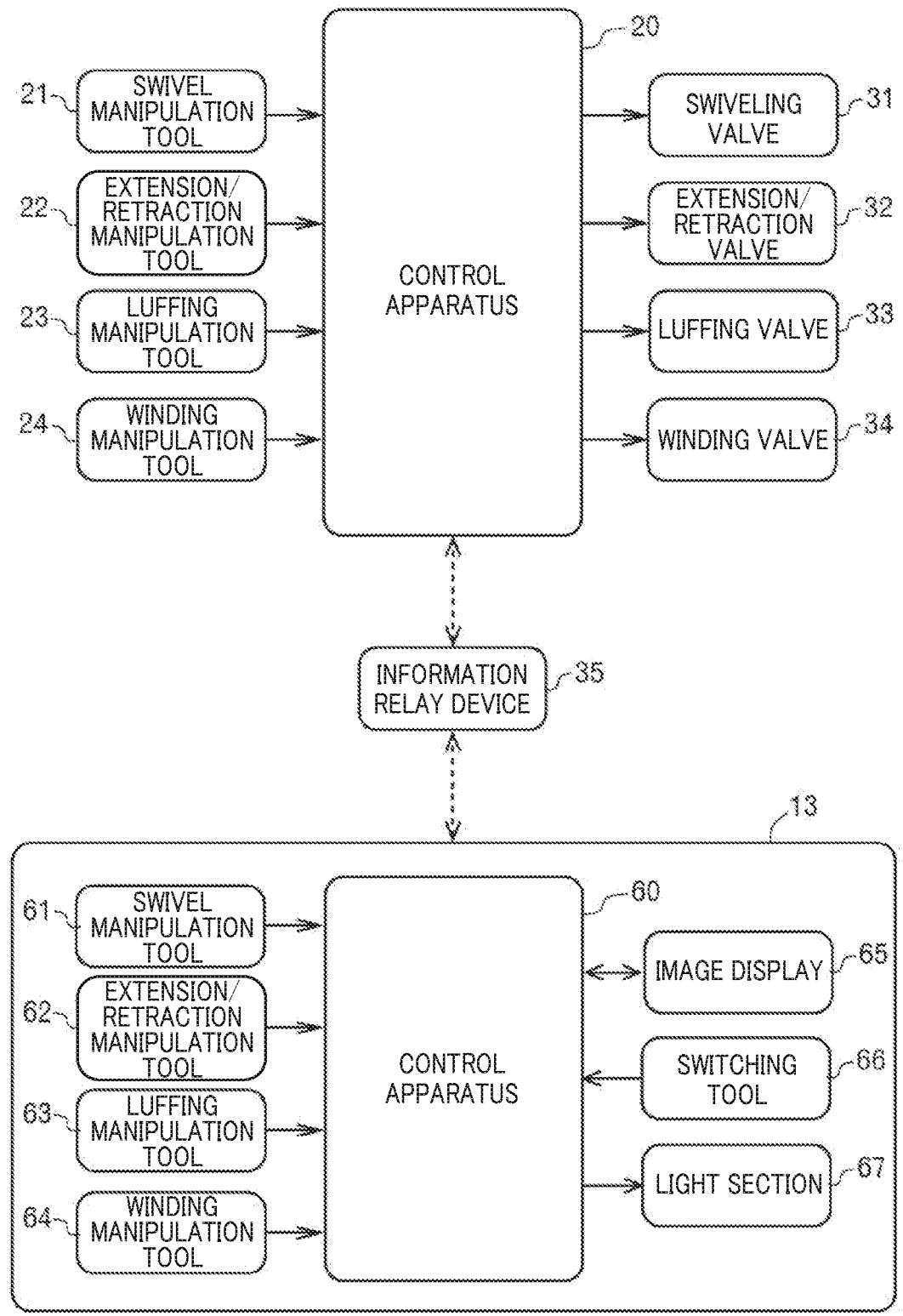
FIG. 2 is a block diagram illustrating a configuration of an operation system.
Figure 3:
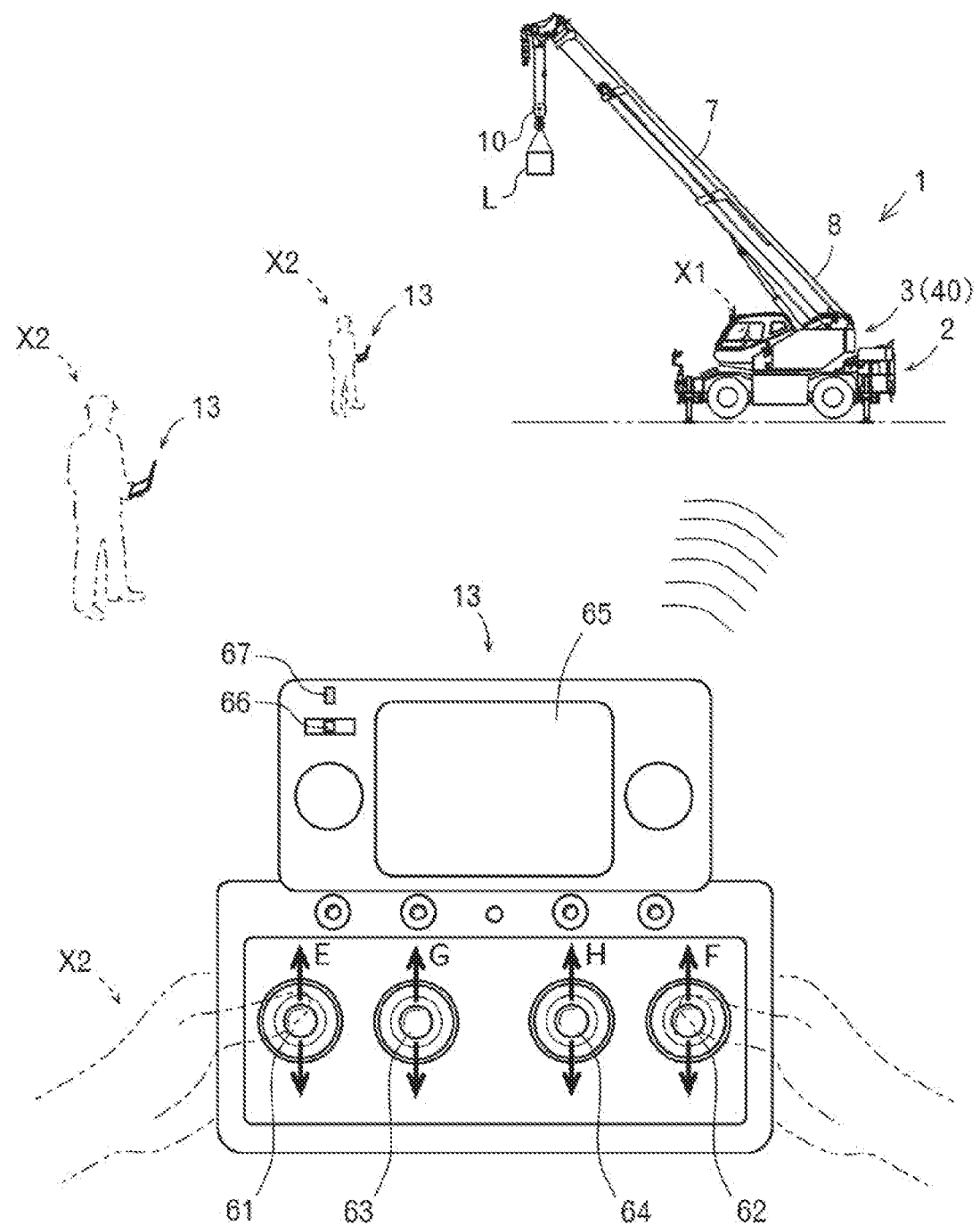
FIG. 3 illustrates a state in which a remote operation terminal is operated.
Figure 4:
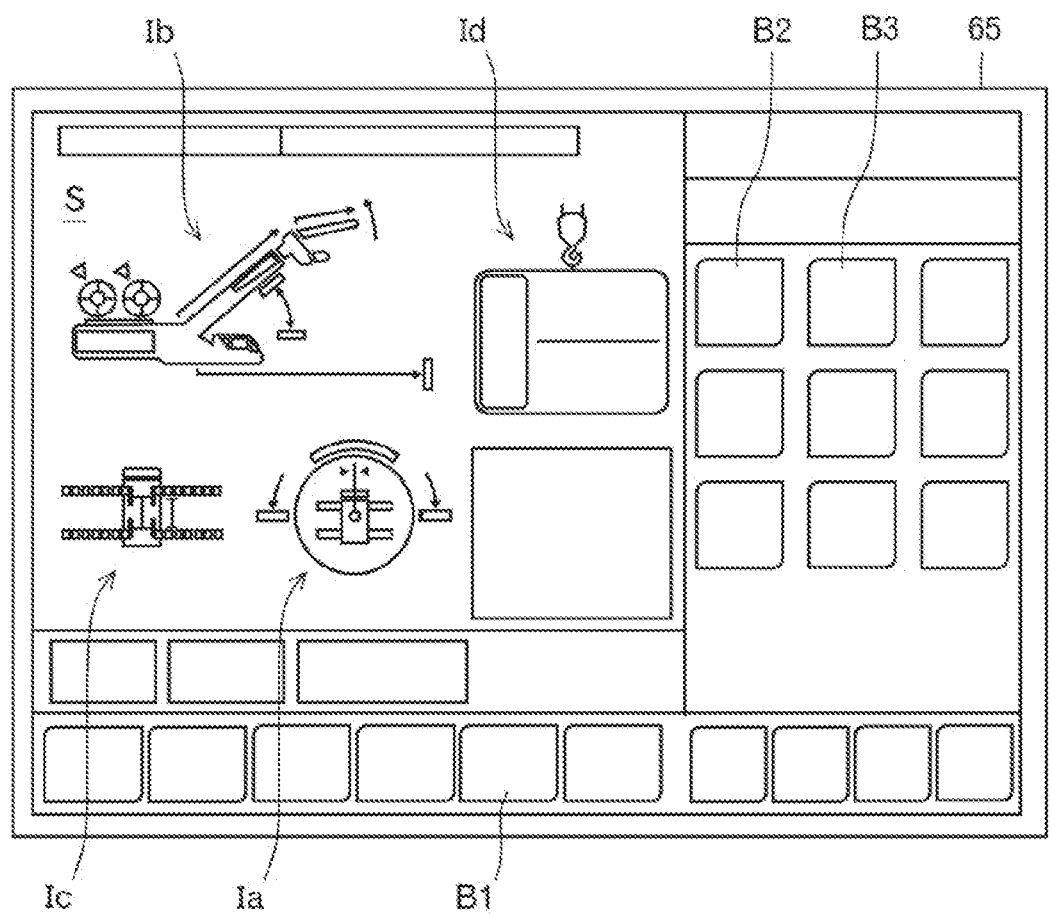
FIG. 4 illustrates a screen on which a primary setting is changed.
Figure 5:
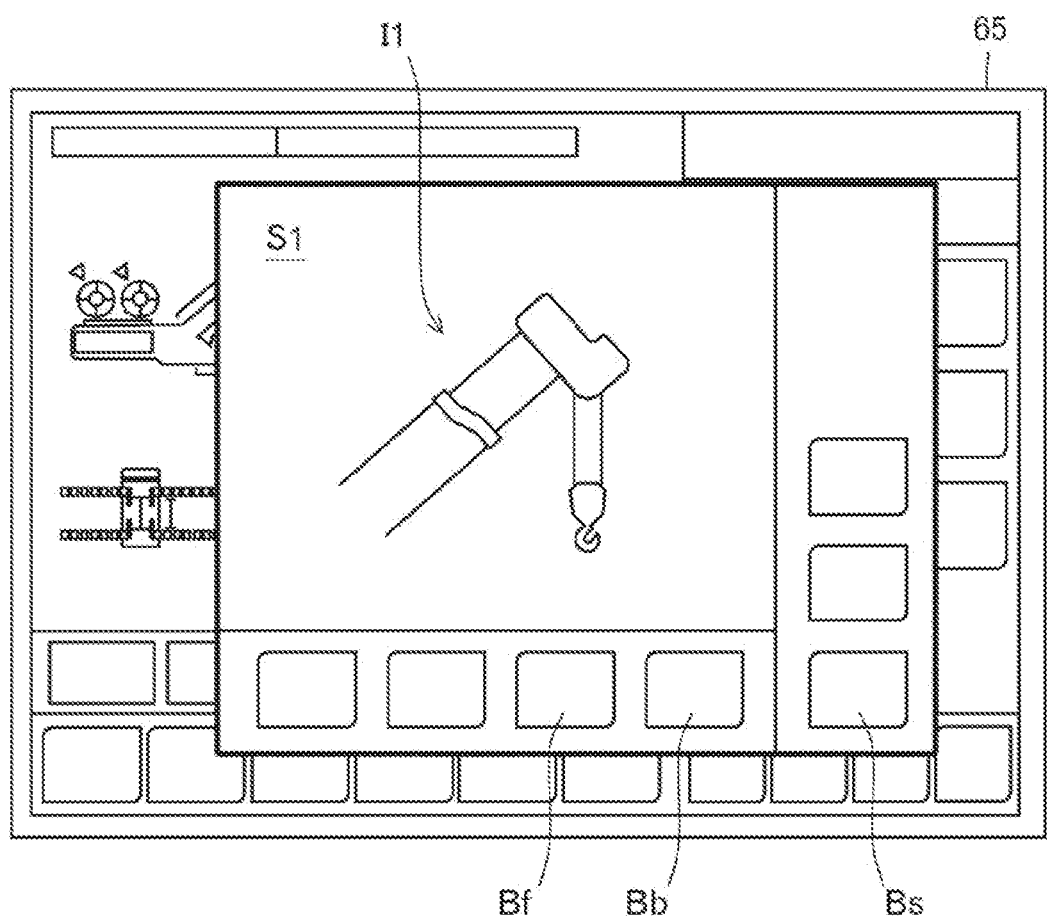
FIG. 5 illustrates a screen on which a crane setting is changed.
Figure 6:
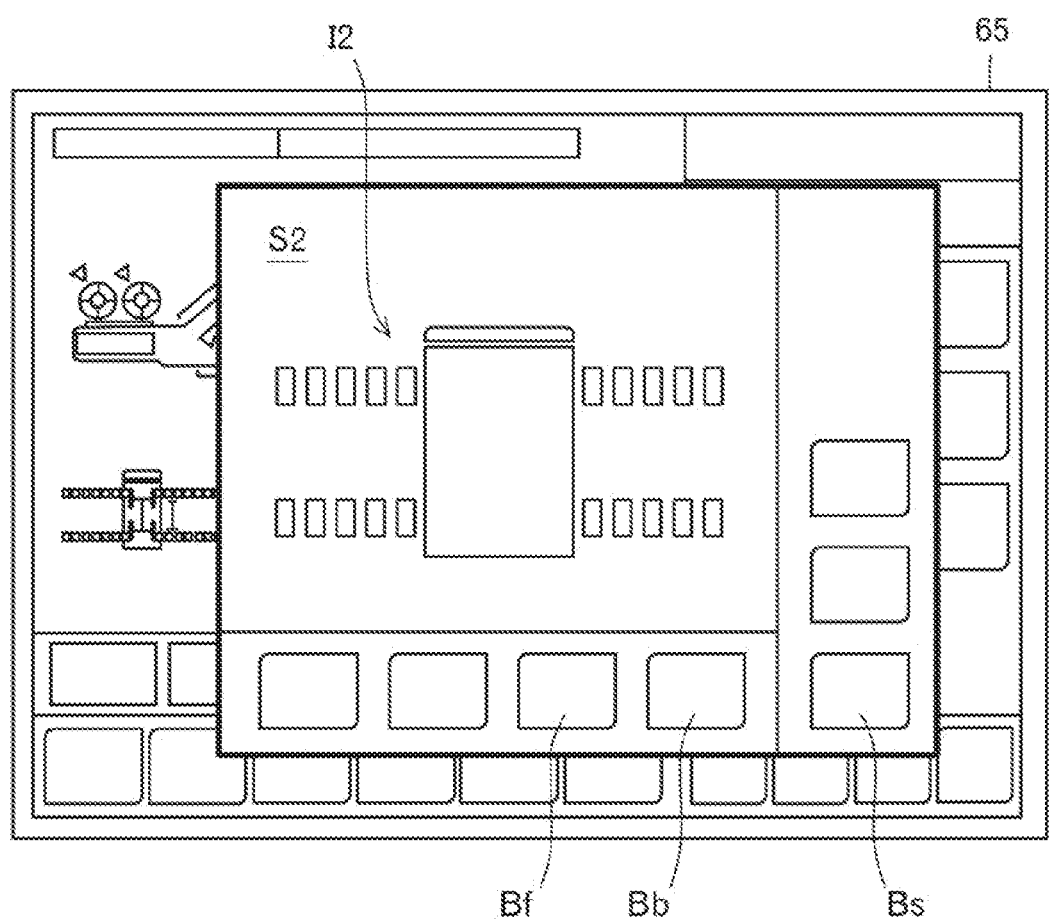
FIG. 6 illustrates a screen on which an outrigger setting is changed.
Figure 7:
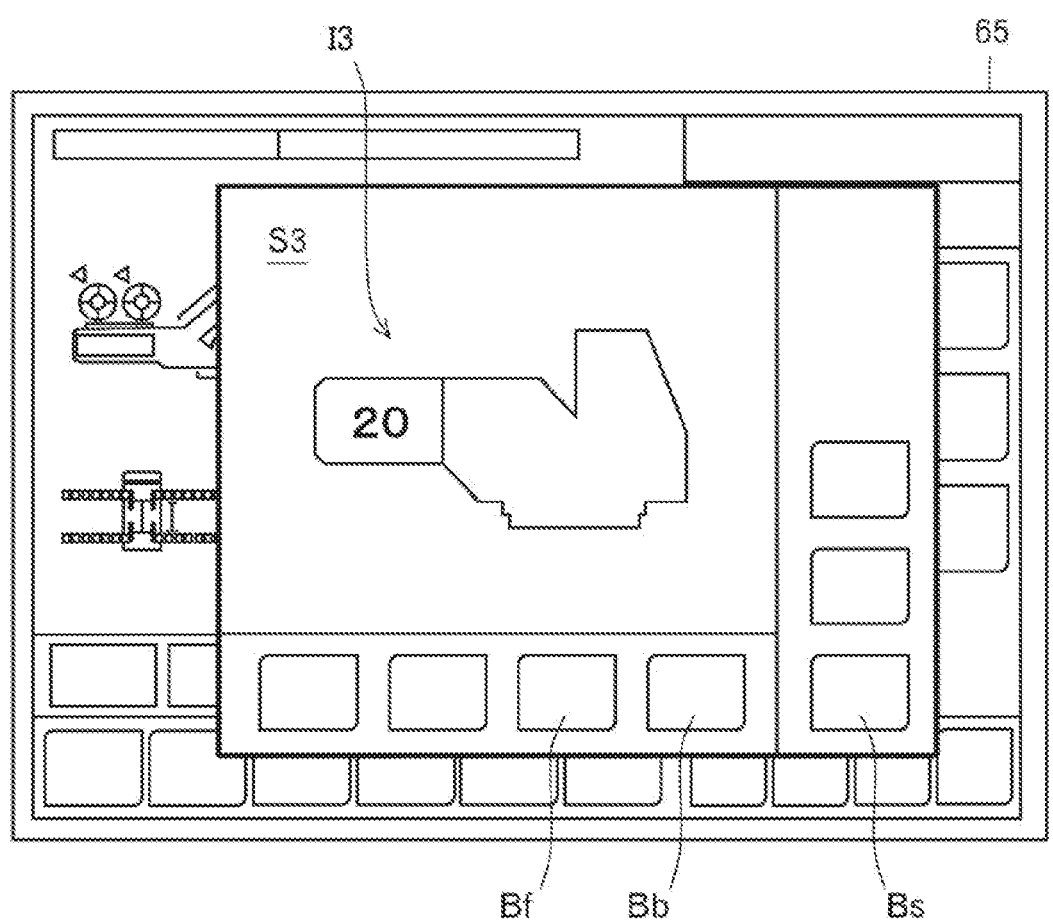
FIG. 7 illustrates a screen on which a counter weight setting is changed.
Figure 9:
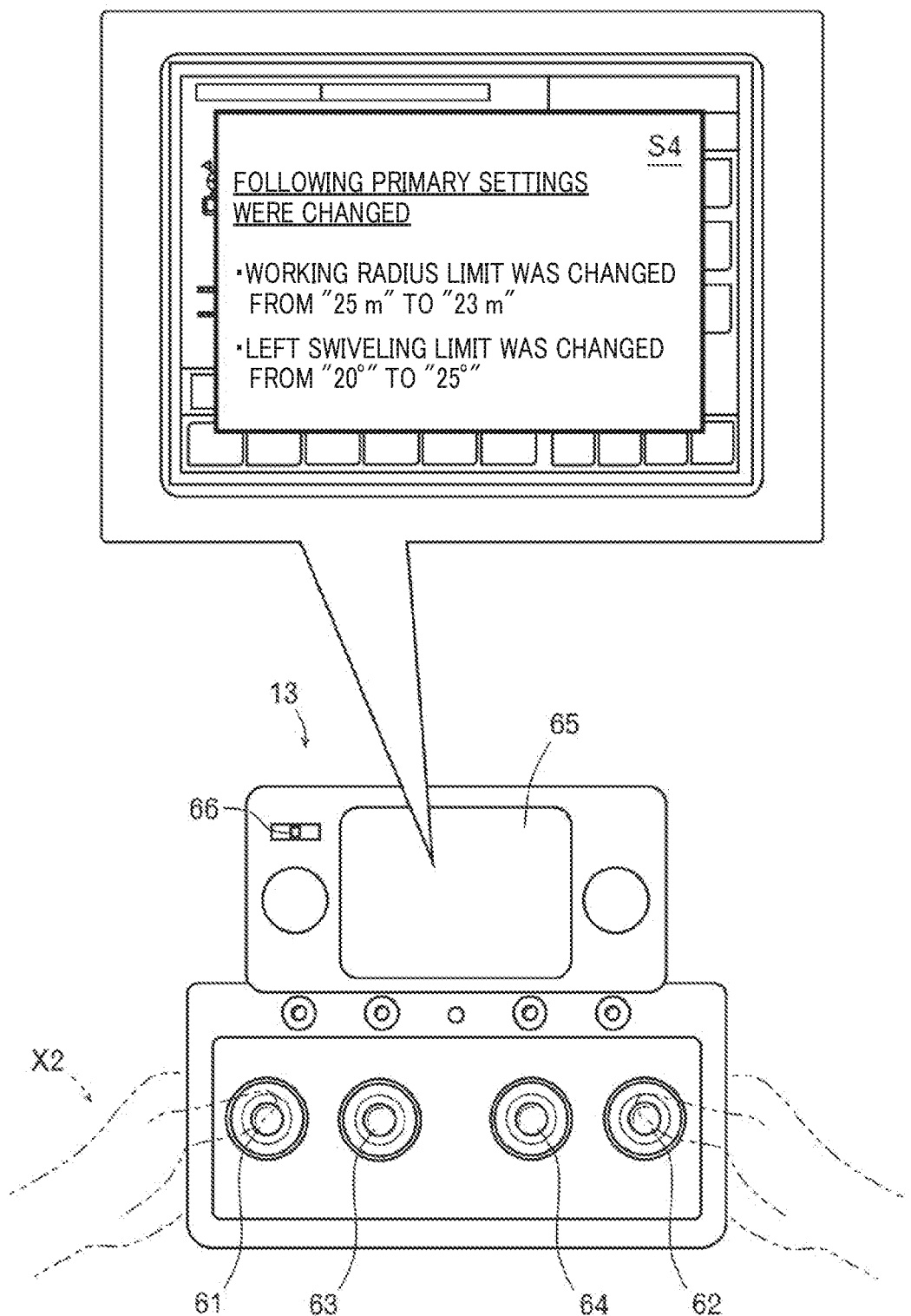
FIG. 9 illustrates a remote operation terminal according to one embodiment.

With regard to this, it is conceivable to display screen S4 in which the content is written, since each remote operation terminal 13 includes image display 65 (see FIGS. 2 and 3). For example, when there are first remote operation terminal 13 to third remote operation terminal 13 and if second remote operation terminal 13 is selected, screen S4 in which the content is written is displayed (see FIG. 9) on image displays 65 of first remote operation terminal 13 and third remote operation terminal 13.

Thus, in crane 1, each remote operation terminal 13 includes image display 65. Screen S4 in which the content to be reflected is written is displayed on image displays 65 of the other remote operation terminals 13. According to such crane 1, it is possible to prevent the primary setting of work apparatus 40 from being changed unexpectedly. Consequently, it is possible to prevent mistakes and confusion in the primary setting.

Figure 10:
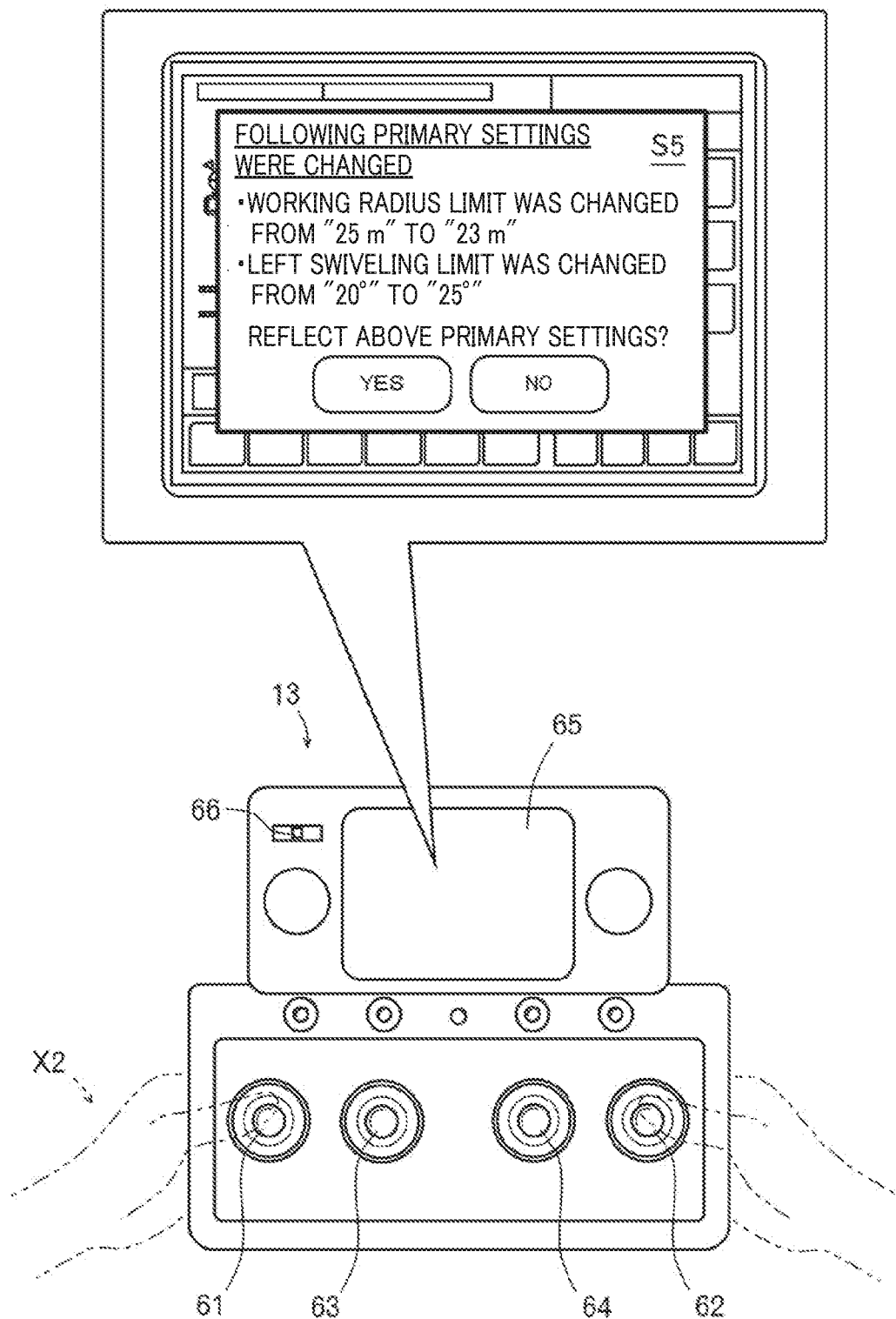
FIG. 10 illustrates a remote operation terminal according to another embodiment.

When one of remote operation terminals 13 is operated, automatic reflection of the content of a previous change in the primary setting may cause confusion. Therefore, it is conceivable to display screen S5 asking whether to reflect the content on image display 65 of the one of remote operation terminals 13. For example, when second remote operation terminal 13 is operated after a change in a primary setting is performed by using first remote operation terminal 13, screen S5 asking whether to reflect the content of the change is displayed (see FIG. 10) on image display 65 of second remote operation terminal 13.

Thus, in crane 1, each remote operation terminal 13 includes image display 65. When one of remote operation terminals 13 is operated, screen S5 asking whether to reflect the content of a previous change in a primary setting is displayed on image display 65 of the one of remote operation terminals 13. According to such crane 1, it is possible to prevent the primary setting of work apparatus 40 from being changed unexpectedly. Consequently, it is possible to prevent mistakes and confusion in the primary setting.

In addition, it is conceivable to display, when it is selected to reflect the content of the previous change in the primary setting, screen S4 in which the content of the change is written, on image displays 65 of the other remote operation terminals 13. For example, when it is selected in second remote operation terminal 13 to reflect the content of a previous change in the primary setting, screen S4 in which the content is written is displayed (see FIG. 9) on image displays 65 of first remote operation terminal 13 and third remote operation terminal 13.

Thus, in crane 1, when it is selected to reflect the content of a previous change in a primary setting, screen S4 in which the content to be reflected is written is displayed on image displays 65 of the other remote operation terminals 13. According to such crane 1, it is possible to prevent a primary setting of work apparatus 40 from being changed unexpectedly. Consequently, it is possible to prevent mistakes and confusion in the primary setting.

In crane 1, while one of remote operation terminals 13 is operated, all of remote operation terminals 13 are prohibited from changing a primary setting. For example, while work apparatus 40 is operated by one of remote operation terminals 13, all of remote operation terminals 13 are prohibited from changing a primary setting.

Thus, in crane 1, while one of remote operation terminals 13 is operated, all of remote operation terminals 13 are prohibited from changing a primary setting. According to such crane 1, it is possible to prevent a primary setting of work apparatus 40 from being changed unexpectedly. Consequently, it is possible to prevent mistakes and confusion in the primary setting. It is also possible to achieve an improvement in the safety of the operation of work apparatus 40.

Last, the technical concept disclosed in the present application is also applicable to the other work vehicles that include a plurality of remote operation terminals 13. For example, the technical concept disclosed in the present application is also applicable to an aerial work platform and the like.

In crane 1, a primary setting of work apparatus 40 is configured to be changed by using remote operation terminal 13. It may be configured such that, of a plurality of remote operation terminals 13, only one of remote operation terminals 13 is allowed to change a primary setting. According to such crane 1, only a person (operator X2) holding predetermined remote operation terminal 13 can change a primary setting of work apparatus 40. Consequently, it is possible to prevent mistakes and confusion in the primary setting, even when a plurality of operators X2 each operate respective remote operation terminals 13.

As a method of determining one of remote operation terminals 13 among a plurality of remote operation terminals 13, it is conceivable to previously specify one of remote operation terminals 13. In other words, one of remote operation terminals 13 is primitively specified by eliminating a range of choice.

In this case, in crane 1, only previously specified one of remote operation terminals 13 is allowed to change a primary setting. According to such crane 1, only a person (operator X2) holding predetermined remote operation terminal 13 can change a primary setting of work apparatus 40 reliably, even with a simple configuration.

In addition, as a method of determining one of remote operation terminals 13 among a plurality of remote operation terminals 13, it is conceivable to enable operator X2 to freely specify one of remote operation terminals 13. In other words, as with remote operation terminal 13 of the present application, switching tool 66 (see FIGS. 2 and 3) is provided such that operator X2 can specify one of remote operation terminals 13 by operating switching tool 66.

In this case, in crane 1, only one of remote operation terminals 13 selected by switching tool 66 is allowed to change a primary setting. According to such crane 1, one of remote operation terminals 13 can be freely selected, and only a person (operator X2) holding the one of remote operation terminals 13 can change a primary setting of work apparatus 40.

In this respect, it is preferable for operator X2 to be able to recognize at a glance whether remote operation terminal 13 is selected one of remote operation terminals 13.

With regard to this, it is conceivable to dispose light section 67 (see FIGS. 2 and 3) on each remote operation terminal 13 and to turn on light section 67 in only selected one of remote operation terminals 13. For example, when there are first remote operation terminal 13 to third remote operation terminal 13 and if second remote operation terminal 13 is selected, only light section 67 disposed on second remote operation terminal 13 is turned on (see FIG. 11). The selection of one of remote operation terminals 13 is, however, not limited to a mode in which the selection is performed by switching tool 66.

In this case, in crane 1, light section 67 is turned on in only remote operation terminal 13 that is allowed to change a primary setting. According to such crane 1, it is possible to recognize at a glance that remote operation terminal 13 is remote operation terminal 13 that is allowed to change a primary setting.

In addition, it is conceivable to display such information on only selected one of remote operation terminals 13, since each remote operation terminal 13 includes image display 65 (see FIGS. 2 and 3). For example, when there are first remote operation terminal 13 to third remote operation terminal 13 and if second remote operation terminal 13 is selected, such information is displayed (see FIG. 12: see a portion marked with ✕) on only image display 65 disposed on second remote operation terminal 13. The selection of one of remote operation terminals 13 is, however, not limited to a mode in which the selection is performed by switching tool 66. Display modes of symbols, characters, and the like are also not limited.

In this case, in crane 1, such information is displayed on image display 65 in only remote operation terminal 13 that is allowed to change a primary setting. According to such crane 1, it is possible to recognize at a glance that remote operation terminal 13 is allowed to change a primary setting.

Next, with reference to FIGS. 13A and 13B, a display mode when an operation of opening above-described initial screen S will be described. In crane 1, initial screen S is opened when a button (not illustrated) is pressed in remote operation terminal 13 that is allowed to change a primary setting. Here, initial screen S is defined as "primary-setting change screen S".

First, remote operation terminal 13 that is allowed to change a primary setting will be described. In remote operation terminal 13 that is allowed to change a primary setting, when a predetermined button is pressed by an operator, primary-setting change screen S is displayed (see FIG. 13A) on image display 65. In primary-setting change screen S, above-described image FIG. 1a, image FIG. 1b, image FIG. 1c, and image FIG. 1d are displayed.

Next, remote operation terminal 13 that is not allowed to change a primary setting will be described. In remote operation terminal 13 that is not allowed to change a primary setting, even when a predetermined button is pressed by an operator, primary-setting change screen S is not displayed on image display 65. Alternatively, a comment, such as "THIS REMOTE OPERATION TERMINAL IS NOT ALLOWED TO CHANGE PRIMARY SETTING", is displayed (see FIG. 13B). At this time, a number and the like of remote operation terminal 13 that is allowed to change a primary setting may be indicated.

As above, in remote operation terminal 13 that is allowed to change a primary setting, primary-setting change screen S is displayed on image display 65, and, in remote operation terminals 13 that are not allowed to change a primary setting, primary-setting change screen S is not displayed on image display 65. According to such crane 1, it is possible for remote operation terminal 13 that is allowed to change a primary setting to perform an operation of changing a primary setting. In remote operation terminals 13 that are not allowed to change a primary setting, even performing an operation of changing a primary setting is not possible. Consequently, it is possible to eliminate an operation of changing a primary setting being performed in vain in remote operation terminals 13 that are not allowed to change a primary setting.

Figure 14:
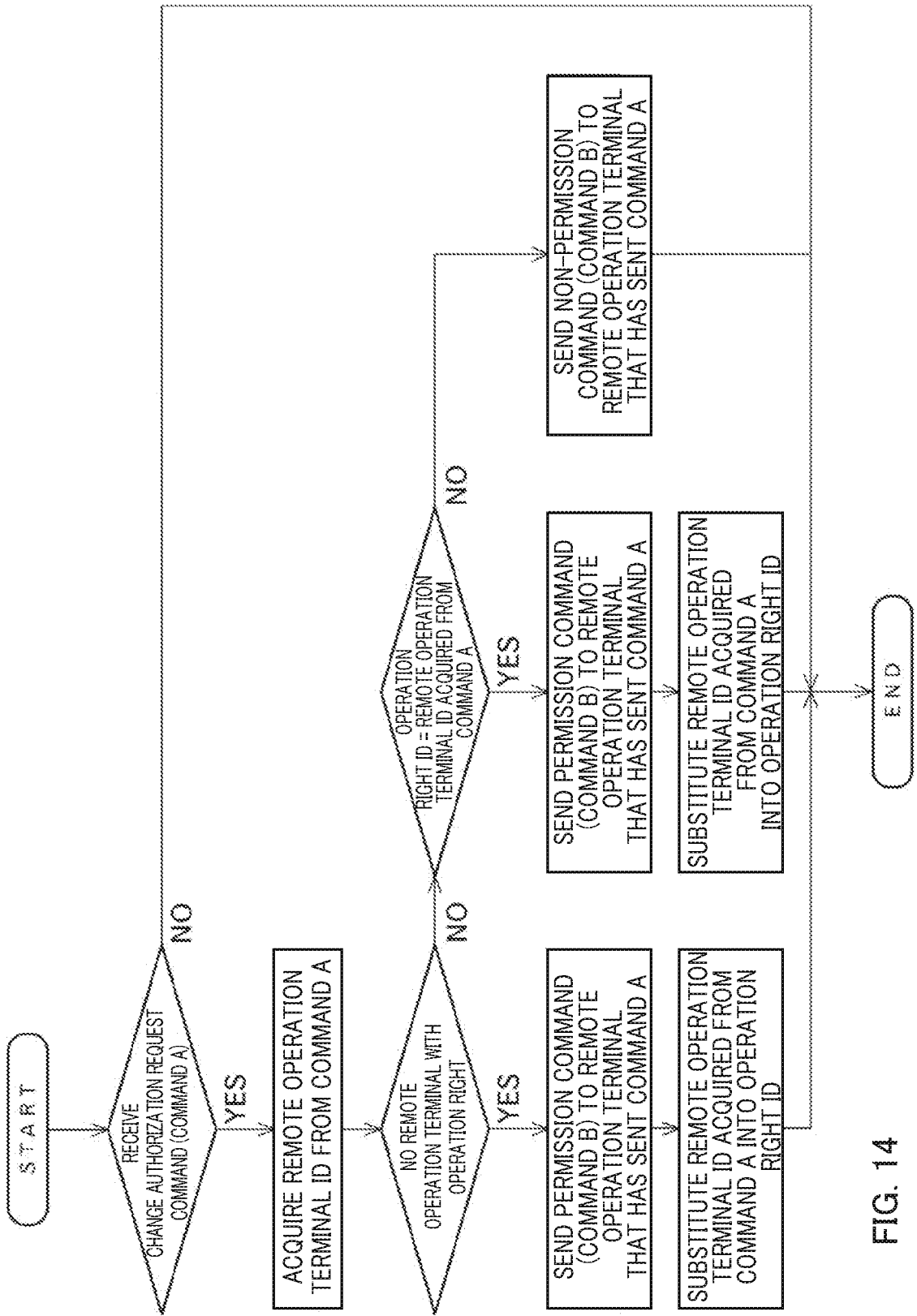
FIG. 14 is a flowchart illustrating processing when a primary setting of a work apparatus is changed.

Next, with reference to FIG. 14, processing in control apparatus 20 will be briefly described. Here, it is assumed that a change authorization request button (which may be, for example, above-described buttons B, B2, and B3 or set-key button Bs, or other buttons) is pressed.

According to the flowchart, a command (command B) that approves authorization can be sent to predetermined remote operation terminal 13. In addition, receiving a change in a primary setting by predetermined remote operation terminal 13 is enabled. This flowchart is, however, an example of a conceivable configuration and is not limited thereto.

Figure 15:
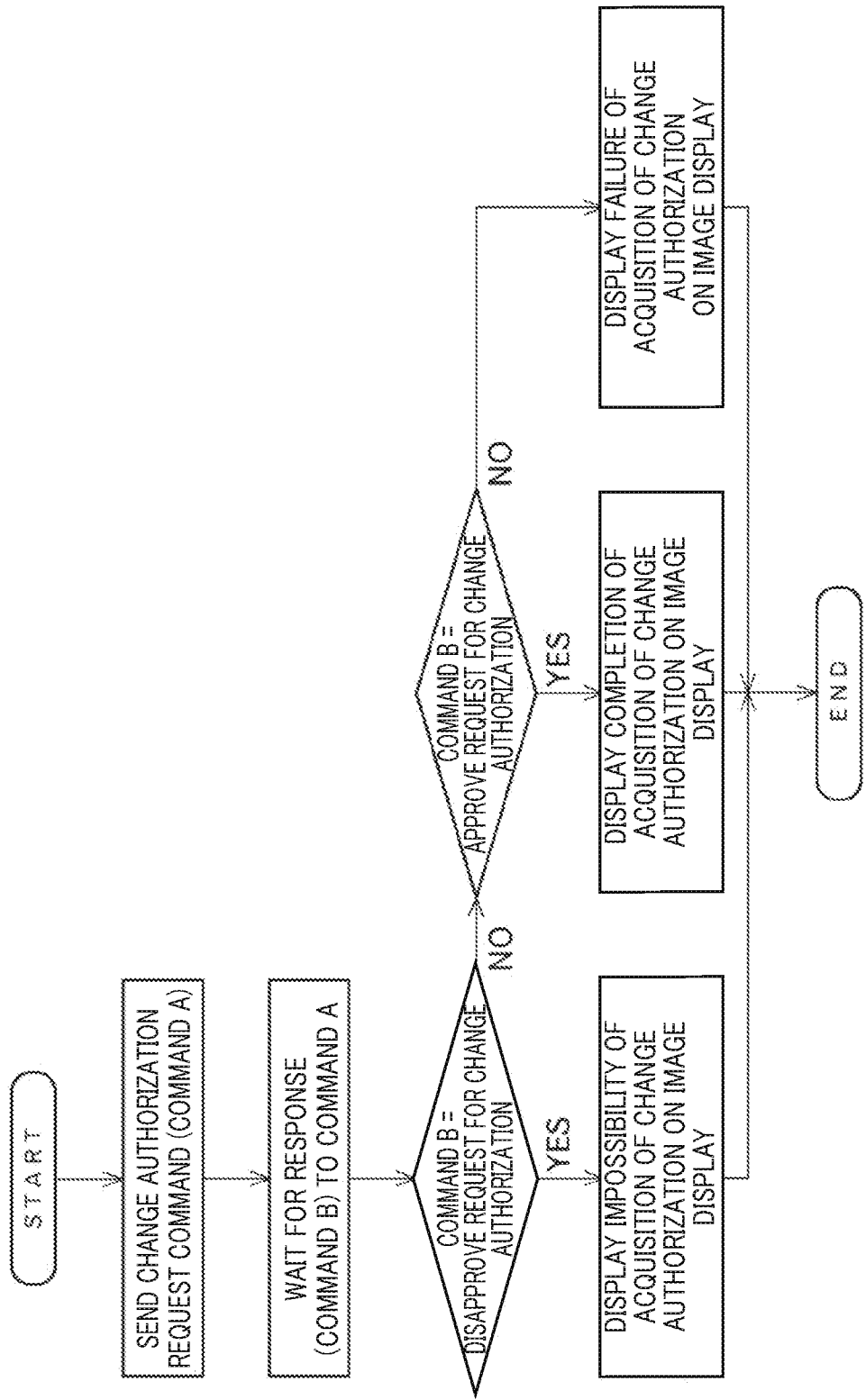
FIG. 15 is a flowchart illustrating processing when a primary setting of a work apparatus is changed.

Next, with reference to FIG. 15, processing in control apparatus 60 will be briefly described. It is also assumed here that a change authorization request button (which may be, for example, above-described buttons B1, B2, and B3 or set-key button Bs, or other buttons) is pressed.

According to the flowchart, on image display 65 of remote operation terminal 13, information that change authorization was acquired or information that change authorization was not acquired is displayed. In addition, information that acquisition of change authorization was failed due to some causes is displayed. This flowchart is, however, an example of a conceivable configuration and is not limited thereto.

Last, the technical concept disclosed in the present application is also applicable to the other work vehicles that include a plurality of remote operation terminals 13. For example, the technical concept disclosed in the present application is also applicable to an aerial work platform and the like.

INDUSTRIAL APPLICABILITY

The present invention is usable for a work vehicle. Specifically, the present invention is usable for a work vehicle that can prevent mistakes and confusion in a primary setting even when a plurality of operators each operate respective remote operation terminals.

REFERENCE SIGNS LIST

1 Crane (work vehicle)
2 Traveling body
3 Swiveling body
7 Boom
10 Hook
13 Remote operation terminal
20 control apparatus
40 Work apparatus
60 Control apparatus
61 Swivel manipulation tool
62 Extension/retraction manipulation tool
63 Luffing manipulation tool
64 Winding manipulation tool
65 Image display
66 Switching tool
67 Light section
L Load
X1 Operator
X2 Operator

The invention claimed is:
1. An operation system, comprising:
a work vehicle having a crane apparatus;
a controller that controls the crane apparatus;
remote operation terminals being configured to respectively operate the crane apparatus; and
an information relay device connected to the controller and the remote operation terminals, wherein:
a primary setting related to operating conditions of the crane apparatus set in the controller is allowed to be changed by transmitting a first radio wave signal from one of the remote operation terminals to the information relay device;
when the primary setting set in the controller is changed by one of the remote operation terminals, the change of the primary setting is also reflected in one or more other remote operation terminals of the remote operation terminals by transmitting a second radio wave signal from the information relay device to the one or more other remote operation terminals;
each of the remote operation terminals includes a switching tool;
only one of the remote operation terminals which is selected by the switching tool is allowed to change the primary setting, and when the primary setting is changed by the one of the remote operation terminals that is allowed to change the primary setting, the change of the primary setting is also reflected in the one or more other remote operation terminals;

each of the remote operation terminals further includes an image display; and when the primary setting is changed by the one of the remote operation terminals that is allowed to change the primary setting, a screen in which a content to be reflected in the primary setting is written is displayed on the image display of each of the one or more other remote operation terminals.

2. The operation system according to claim 1, wherein:

each of the remote operation terminals further includes a light section; and the light section is turned on in only the one of the remote operation terminals that is allowed to change the primary setting.

3. The operation system according to claim 1, wherein:

in the one of the remote operation terminals that is allowed to change the primary setting, a primary-setting change screen is displayed on the image display; and in each of the one or more other remote operation terminals that are not allowed to change the primary setting, the primary-setting change screen is not displayed on the image display.

4. The operation system according to claim 1, wherein the operating conditions of the crane apparatus are changed based on the change in the primary setting.

\* \* \* \* \*